United States Patent
Yang

(10) Patent No.: US 11,024,911 B2
(45) Date of Patent: Jun. 1, 2021

(54) SECONDARY BATTERY

(71) Applicant: Jiangsu Contemporary Amperex Technology Limited, Jiangsu (CN)

(72) Inventor: Jianxiong Yang, Jiangsu (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 0 days.

(21) Appl. No.: 16/549,084

(22) Filed: Aug. 23, 2019

(65) Prior Publication Data
US 2020/0411807 A1     Dec. 31, 2020

(30) Foreign Application Priority Data

Jun. 28, 2019  (CN) .......................... 201921000978.2

(51) Int. Cl.
| | | |
|---|---|---|
| *H01M 2/04* | (2006.01) | |
| *H01M 2/30* | (2006.01) | |
| *H01M 2/06* | (2006.01) | |
| *H01M 2/26* | (2006.01) | |
| *H01M 50/15* | (2021.01) | |
| *H01M 50/531* | (2021.01) | |
| *H01M 50/543* | (2021.01) | |
| *H01M 50/172* | (2021.01) | |

(52) U.S. Cl.
CPC ......... *H01M 50/15* (2021.01); *H01M 50/172* (2021.01); *H01M 50/531* (2021.01); *H01M 50/543* (2021.01)

(58) Field of Classification Search
CPC .. H01M 2/06–03; H01M 2/0473; H01M 2/26; H01M 2/30
See application file for complete search history.

(56) References Cited

U.S. PATENT DOCUMENTS

2011/0305928 A1* 12/2011 Kim ..................... H01M 2/34
429/61

FOREIGN PATENT DOCUMENTS

| CN | 208256820 U | 12/2018 |
|---|---|---|
| CN | 208819974 U | 5/2019 |
| DE | 112013002085 T5 | 3/2015 |

(Continued)

OTHER PUBLICATIONS

The Extended European Search Report for European Application No. 19194487.5, dated Mar. 31, 2020, 5 pages.

*Primary Examiner* — Osei K Amponsah
(74) *Attorney, Agent, or Firm* — Law Offices of Liaoteng Wang

(57) ABSTRACT

The disclosure relates to a secondary battery comprising: a cap assembly comprising a cap plate comprising an electrode lead-out hole and an electrode terminal disposed on the cap plate and covering the electrode lead-out hole; a current collector comprising a main body located at a side of the cap plate and an extending portion extending toward the electrode terminal, wherein the extending portion comprises a top plate connected to the electrode terminal and a side plate connected to the main body, the side plate is at least partially disposed in the electrode lead-out hole, and the side plate and the top plate are configured to form a recess; and an insulating protection component comprising a column portion disposed in the recess, wherein surfaces of the side plate and the top plate which form the recess are in contact with the column portion and covered by the column portion.

19 Claims, 6 Drawing Sheets

(56) References Cited

FOREIGN PATENT DOCUMENTS

EP    2395576 A1    12/2011
JP    2013114940 A    6/2013

* cited by examiner

SECONDARY BATTERY

CROSS-REFERENCE TO RELATED APPLICATION

This application is based on and claims priority to Chinese Patent Application No. 201921000978.2 filed on Jun. 28, 2019, which is incorporated herein by reference in its entirety.

FIELD

The disclosure relates to the technical field of battery, and in particular to a secondary battery.

BACKGROUND

With the development of science and technology, secondary batteries are widely used in portable electronic devices such as mobile phones, digital video cameras and laptop computers, and may be widely used in large and medium-sized electric devices such as energy storage facilities and electric vehicles, such as electric cars and electric bicycles. The secondary battery becomes important technical means to solve global problems such as energy crisis and environmental pollution. A secondary battery comprises a case, an electrode assembly housed within the case, a connecting plate connected to the electrode assembly and an electrode terminal for charging and discharging the electrode assembly. The connecting plate has a protrusion connected to the electrode terminal. A depression corresponding to the protrusion will be formed during the forming of the protrusion. Metal debris are generated when the protrusion is welded to the electrode terminal. Some metal debris retain in the depression. During the use of the secondary battery, the metal debris may fall to the electrode assembly, such that there is a risk that the metal debris pierce the separator to cause the cathode and the anode to be short-circuited.

SUMMARY

According to embodiments of the disclosure, there is provided a secondary battery which can effectively prevent metal debris remaining on its current collector from falling by using an insulating protection component and thus improve safety of the secondary battery in operation.

According to embodiments of the disclosure, there is provided a secondary battery comprising: a cap assembly comprising a cap plate and an electrode terminal, wherein the cap plate comprises an electrode lead-out hole, and the electrode terminal is disposed on the cap plate and covers the electrode lead-out hole; a current collector comprising a main body and an extending portion, wherein the main body is located at a side of the cap plate, the extending portion extends toward the electrode terminal in the axial direction of the electrode lead-out hole, the extending portion comprises a top plate and a side plate that are connected to the main body, the side plate is at least partially disposed in the electrode lead-out hole, the top plate is connected to the electrode terminal, and the side plate and the top plate are configured to form a recess; and an insulating protection component comprising a column portion, wherein the column portion is disposed in the recess, and surfaces of the side plate and the top plate which form the recess are in contact with the column portion and covered by the column portion.

According to an aspect of embodiments of the disclosure, along a radial direction of the electrode lead-out hole, both a radial dimension of the recess and a radial dimension of the column portion are gradually reduced in a direction away from the top plate.

According to an aspect of embodiments of the disclosure, an inner surface of the side plate forming the recess is a tapered surface, and an outer surface of the column portion that matches the inner surface is a tapered surface.

According to an aspect of embodiments of the disclosure, one of the side plate and the column portion is provided with a dent that communicates with the recess, and the other is provided with a bulge connected to the dent.

According to an aspect of embodiments of the disclosure, the column portion is a solid structural body, and a surface of the column portion away from the top plate is flush with an opening edge of the recess.

According to an aspect of embodiments of the disclosure, the insulating protection component further comprises an exposed portion, wherein the column portion is connected to the exposed portion, and the exposed portion is disposed at a side of the main body away from the electrode terminal.

According to an aspect of embodiments of the disclosure, the column portion and the exposed portion are integrally formed.

According to an aspect of embodiments of the disclosure, the exposed portion comprises a protruding portion that extends beyond an opening edge of the recess, wherein the protruding portion covers the opening edge, and the protruding portion is in contact with a surface of the main body away from the electrode terminal.

According to an aspect of embodiments of the disclosure, the insulating protection component comprises a depression, which is recessed toward the column portion from a surface of the exposed portion away from the column portion.

According to an aspect of embodiments of the disclosure, the column portion is a solid structural body, and a depth of the depression does not exceed an opening edge of the recess.

According to an aspect of embodiments of the disclosure, the insulating protection component has a viscosity.

The secondary battery according to embodiments of the disclosure comprises a current collector that connects the electrode assembly and the electrode terminal. The current collector comprises a main body and an extending portion. The extending portion comprises a top plate connected to the electrode terminal and a side plate connected to the top plate. The top plate and the side plate are collectively configured to form a recess. The insulating protection component comprises a column portion disposed in the recess. Since the column portion is in contact with and covers the surfaces of the top plate and the side plate forming the recess, the column portion can block the recess, such that it can serve as a barrier for metal debris or other dust particles adhered to the surfaces of the side plate and the top plate forming the recess, reduce the possibility that the metal debris or other dust particles fall from the recess to the electrode assembly, reduce the possibility that the metal debris or other dust particles pierce the separator of the electrode assembly to cause an internal short circuit between the two electrode plates with opposite polarities, and effectively improves the safety in use of the secondary battery.

BRIEF DESCRIPTION OF THE DRAWINGS

Features, advantages, and technical effects of exemplary embodiments of the disclosure will be described below with reference to accompanying drawings.

Figure 1:
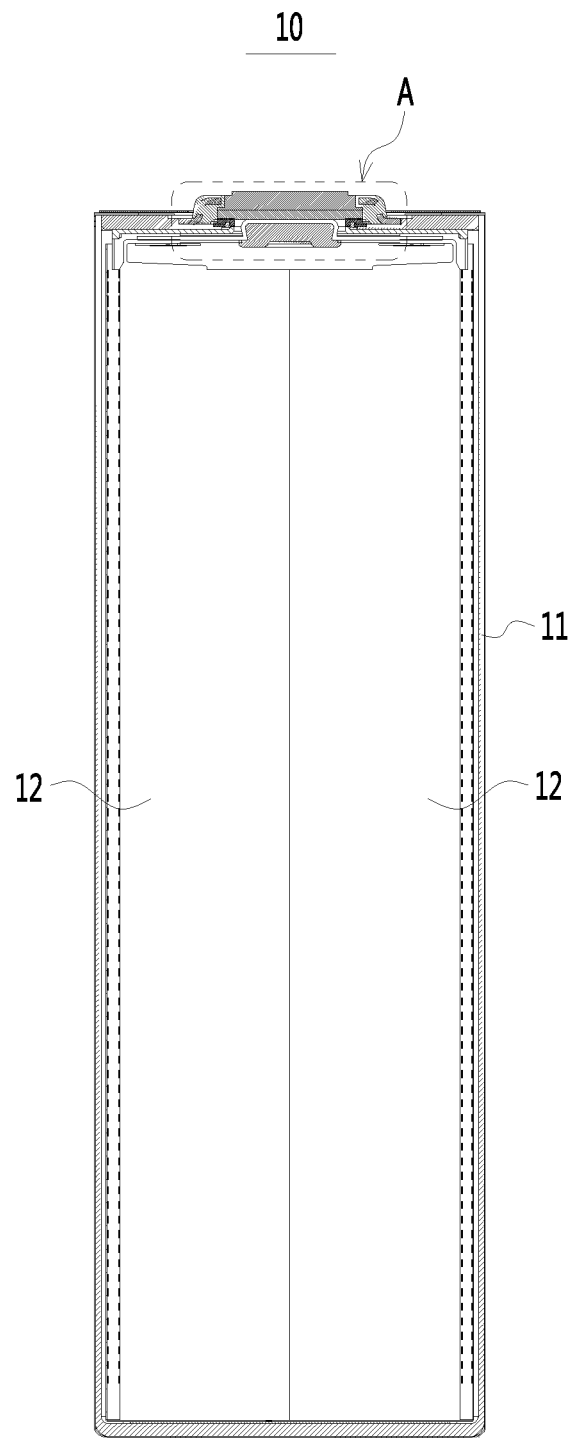
FIG. 1 is a sectional structural diagram of a secondary battery according to an embodiment of the disclosure.

The views are not necessarily plotted in actual proportion in the drawings.

REFERENCE SIGNS IN THE DRAWINGS 10 secondary battery;
11 case;
12 electrode assembly;
13 cap assembly;
131 cap plate;
131a electrode lead-out hole;
132 electrode terminal;
14 current collector;
14a main body;
14b extending portion;
141 top plate;
142 side plate;
142a inner surface;
143 recess;
144 edge;
15 insulating protection component;
151 column portion;
151a outer surface;
152 exposed portion;
152a protruding portion;
153 depression;
100 dent;
200 bulge;
X axial direction;
Y first direction.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure. That is, the disclosure is not limited to the described embodiments.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", and the like are configured for descriptive purposes only and are not to be construed as indicating or implying relative importance.

In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

For better understanding of the disclosure, embodiments of the disclosure will be described below with reference to FIGS. 1 to 8.

Figure 2:
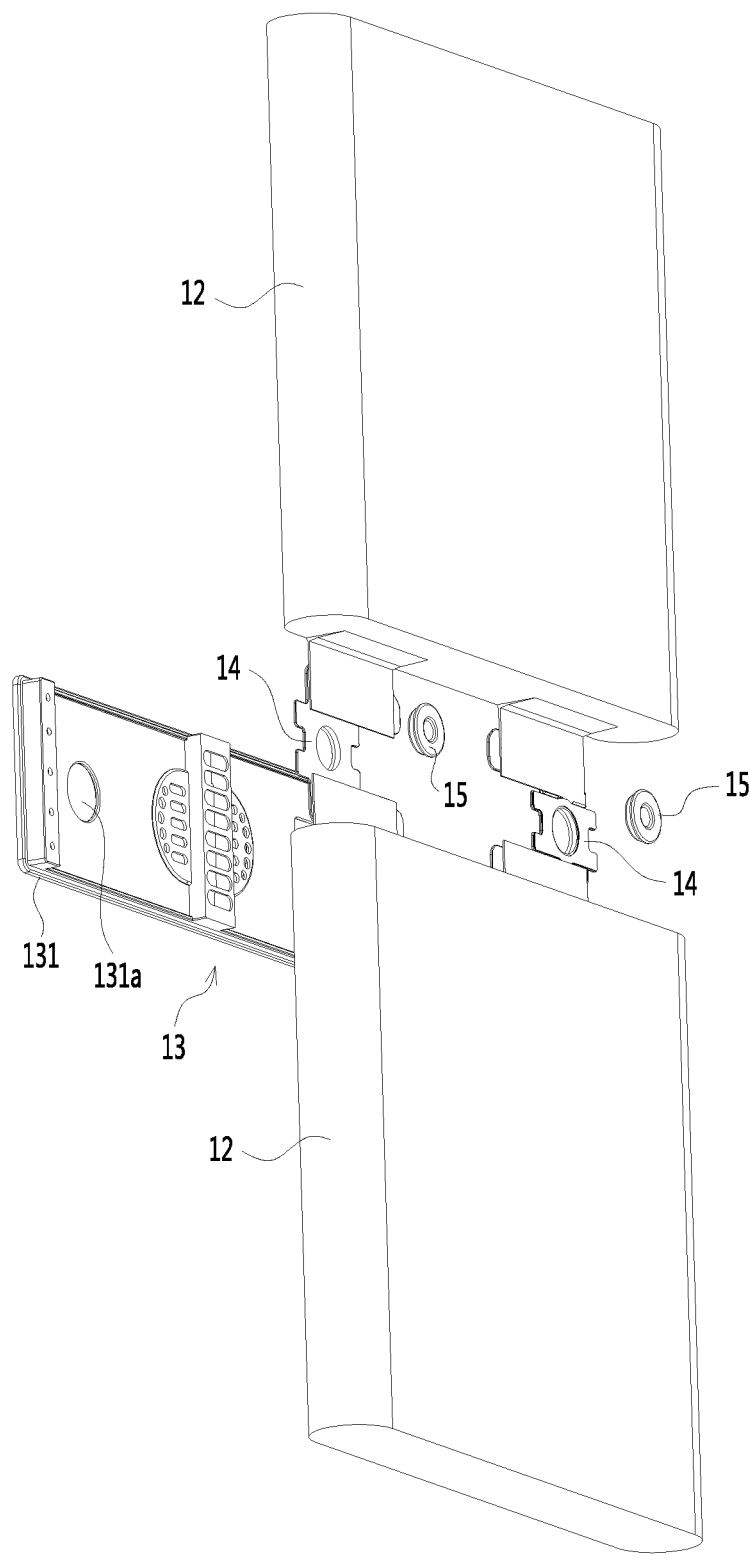
FIG. 2 is an exploded view of a partial structure of a secondary battery according to an embodiment of the disclosure.

Referring to FIGS. 1 and 2, a secondary battery 10 according to embodiments of the disclosure comprises a case 11, an electrode assembly 12 disposed within the case 11, and a cap assembly 13 sealingly connected to the case 11.

The case 11 according to embodiments of the disclosure is formed in a shape of a hexahedron such as a rectangular cuboid or in other shapes. The case 11 has an internal space in which the electrode assembly 12 and electrolyte are accommodated. The case 11 can be made of a material such as aluminum, aluminum alloy or plastic.

The electrode assembly 12 according to embodiments of the disclosure can form a body by stacking or winding a first electrode plate, a second electrode plate, and a separator between the first electrode plate and the second electrode plate together, wherein the separator is an insulator between the first electrode plate and the second electrode plate. The electrode assembly 12 according to the embodiment has a flat overall shape with predetermined thickness, height and width. In the embodiment, the description is made by exemplarily taking the first electrode plate as a positive electrode plate and the second electrode plate as a negative electrode plate. Similarly, in other embodiments, the first electrode plate may be a negative electrode plate, and the second electrode plate may be a positive electrode plate. Furthermore, a positive active material is coated on a coating region of the positive electrode plate, while a negative active material is coated on a coating region of the negative electrode plate. A plurality of uncoated regions extending from the coating regions of the body serve as tabs. The electrode assembly 12 comprises two tabs, i.e., a positive tab and a negative tab. The positive tab extends from the coating region of the positive electrode plate while the negative tab extends from the coating region of the negative electrode plate.

Figure 4:
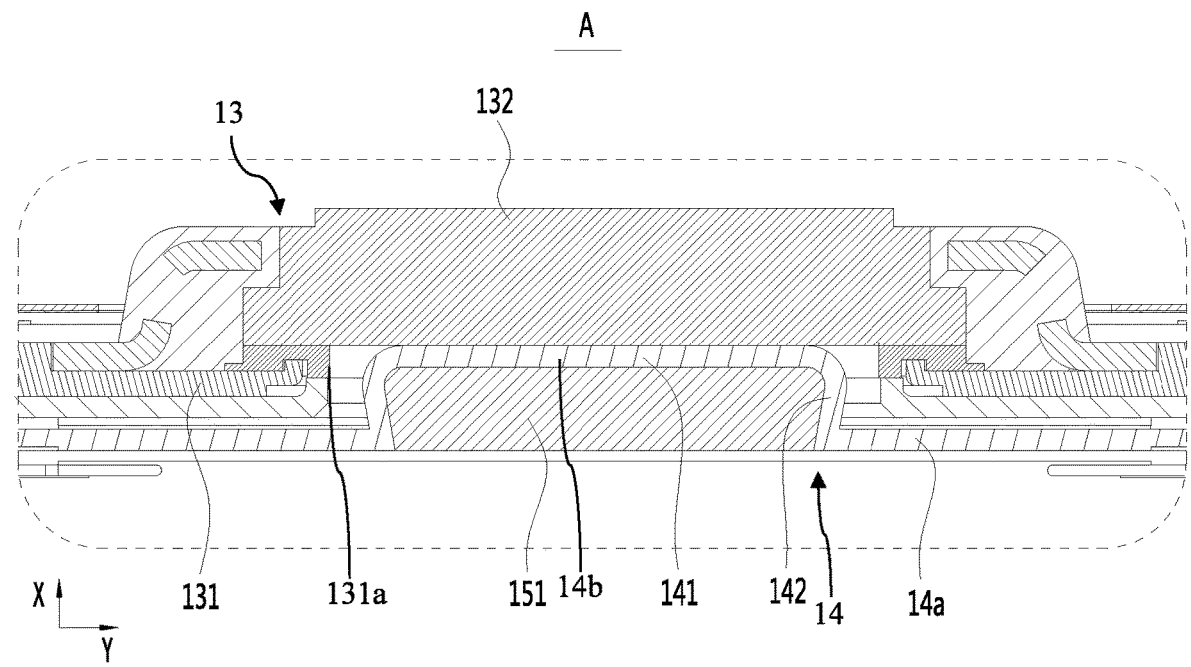
FIG. 4 is an enlarged view of a portion A in FIG. 1.

Referring to FIG. 4, the cap assembly 13 according to embodiments of the disclosure comprises a cap plate 131 and an electrode terminal 132. The cap plate 131 is configured to sealingly connect with the case 11 to enclose the electrode assembly 12 within the case 11. The cap plate 131 comprises an electrode lead-out hole 131a. The electrode terminal 132 is disposed on the cap plate 131 and covers the electrode lead-out hole 131a. In one example, the electrode terminal 132 is disposed on a side of the cap plate 131 away from the electrode assembly 12.

Figure 3:
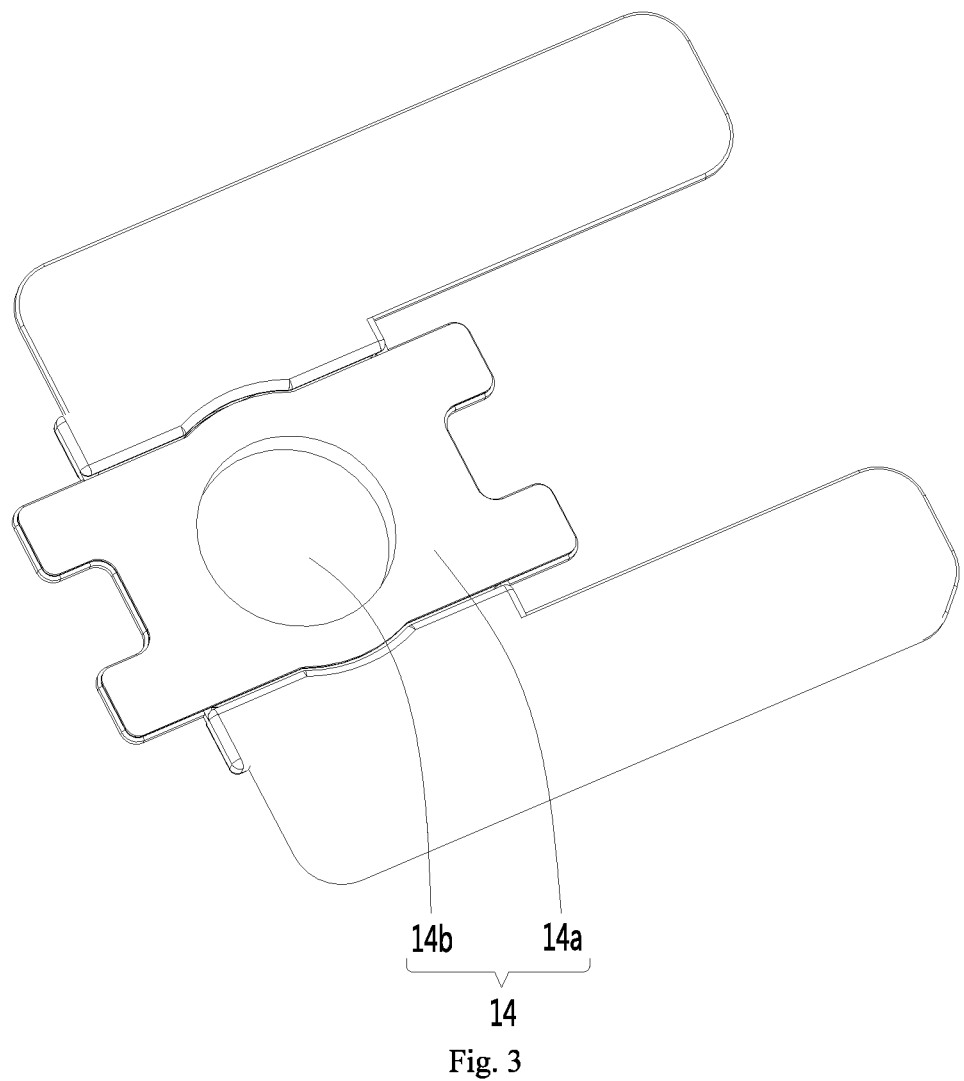
FIG. 3 is a structural schematic diagram of a current collector according to an embodiment of the disclosure.

Referring to FIGS. 3 and 4, the secondary battery 10 according to embodiments of the disclosure further comprises a current collector 14 that connects the electrode assembly 12 and the electrode terminal 132. The current collector 14 comprises a main body 14a and an extending portion 14b. Optionally, the main body 14a and the extending portion 14b may be separately formed or integrally formed. The main body 14a is located at a side of the cap plate 131. In an axial direction X of the electrode lead-out hole 131a, the main body 14a and the electrode terminal 132 are disposed on opposite sides of the cap plate 131 respectively. The extending portion 14b extends toward the electrode terminal 132 in the axial direction X of the electrode lead-out hole 131a. The extending portion 14b comprises a top plate 141 and a side plate 142 that are connected to the main body 14a. The extending portion 14b is connected to the main body 14a through the side plate 142. The side plate 142 has an annular shape. The side plate 142 is at least partially disposed in the electrode lead-out hole 131a. The top plate 141 is connected to the electrode terminal 132. Optionally, the top plate 141 is welded to the electrode terminal 132. The side plate 142 and the top plate 141 are configured to form a recess 143. Optionally, the recess 143 opens to the electrode assembly 12.

Referring to FIGS. 2 and 4, the secondary battery 10 according to embodiments of the disclosure further comprises an insulating protection component 15. The insulating protection component 15 comprises a column portion 151. The column portion 151 is disposed in the recess 143. The surfaces of the side plate 142 and the top plate 141 which form the recess 143 are in contact with the column portion 151 and completely covered by the column portion 151. An outer surface of the column portion 151 facing the extending portion 14b touches the surfaces of the side plate 142 and the top plate 141 forming the recess 143. Optionally, an outer surface 151a of the column portion 151 facing the extending portion 14b closely touches the surfaces of the side plate 142 and the top plate 141 forming the recess 143 in each region.

The secondary battery 10 according to embodiments of the disclosure comprises a current collector 14 that connects the electrode assembly 12 and the electrode terminal 132. The current collector 14 comprises a main body 14a and an extending portion 14b. The extending portion 14b comprises a top plate 141 connected to the electrode terminal 132 and a side plate 142 connected to the top plate 141. The top plate 141 and the side plate 142 are collectively configured to form a recess 143. The insulating protection component 15 comprises a column portion 151 disposed in the recess 143. Since the column portion 151 is in contact with and covers the surfaces of the top plate 141 and the side plate 142 forming the recess 143, the column portion 151 can block the recess 143, such that it can serve as a barrier for metal debris or other dust particles adhered to the surfaces of the side plate 142 and the top plate 141 forming the recess 143, reduce the possibility that the metal debris or other dust particles fall from the recess 143 to the electrode assembly 12, reduce the possibility that the metal debris or other dust particles pierce the separator of the electrode assembly 12 to cause an internal short circuit between the two electrode plates with opposite polarities, and effectively improves the safety in use of the secondary battery 10.

Figure 5:
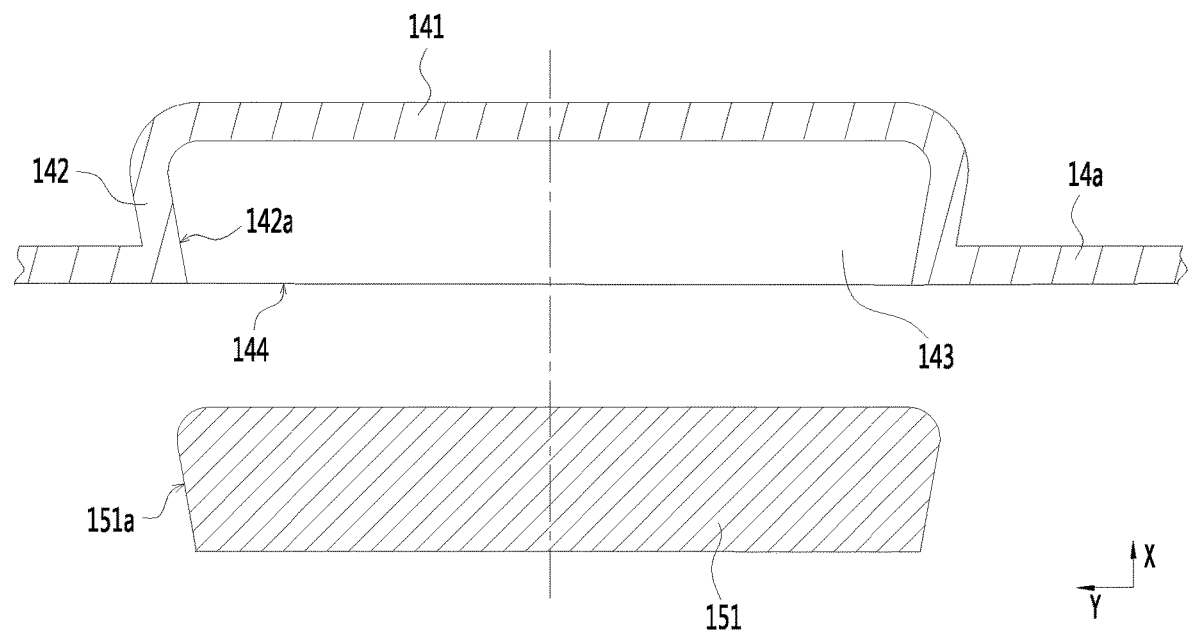
FIG. 5 is an exploded structural view of an insulating protection component and an extending portion of a current collector according to an embodiment of the disclosure.

In an embodiment, as shown in FIGS. 4 and 5, along a radial direction Y of the electrode lead-out hole 131a, both a radial dimension of the recess 143 and a radial dimension of the column portion 151 are gradually reduced in a direction away from the top plate 141. Accordingly, the column portion 151 is restrained by the side plate 142 and thus will not easily come out from the recess 143. The connection stability between the column portion 151 and the extending portion 14b is ensured. It reduces the possibility that the protection effect in the operation of the secondary battery 10 fails when the column portion 151 comes out from the recess 143 and thus the metal debris or other dust particles within the recess 143 fall to the electrode assembly 12. Optionally, after the top plate 141 is connected to the electrode terminal 132, a molten plastic or hot melt adhesive is injected into the recess 143. The column portion 151 of the insulating protection component 15 is formed after the plastic or hot melt adhesive solidifies. In one example, an inner surface 142a of the side plate 142 forming the recess 143 is a tapered surface such that the recess 143 is formed as a tapered hole. Correspondingly, the outer surface 151a of the column portion 151 that matches the inner surface 142a of the side plate 142 is a tapered surface. Optionally, each of the inner surface 142a of the side plate 142 forming the recess 143 and the outer surface 151a of the column portion 151 matching the inner surface 142a is a pyramidal surface, such that each of the side plate 142 and the column portion 151 has a polygonal contour in the cross section view. Optionally, each of the inner surface 142a of the side plate 142 forming the recess 143 and the outer surface 151a of the column portion 151 matching the inner surface 142a is a conical surface, such that each of the side plate 142 and the column portion 151 has a circular contour in the cross section view.

Figure 6:
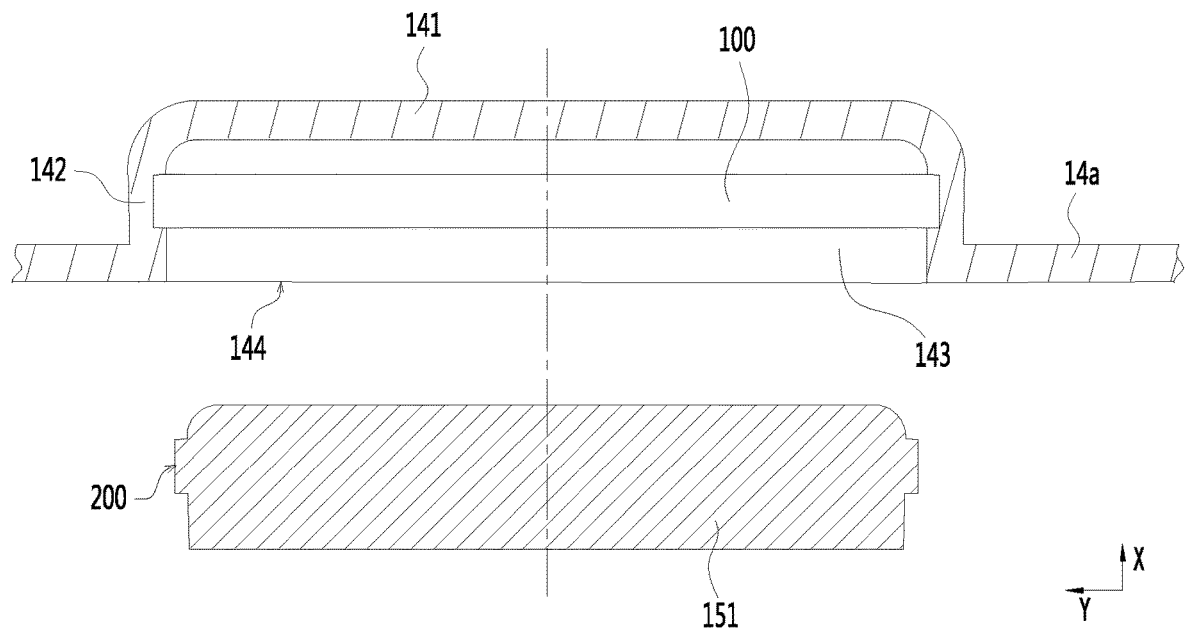
FIG. 6 is an exploded structural view of an insulating protection component and an extending portion of a current collector according to another embodiment of the disclosure.
Figure 7:
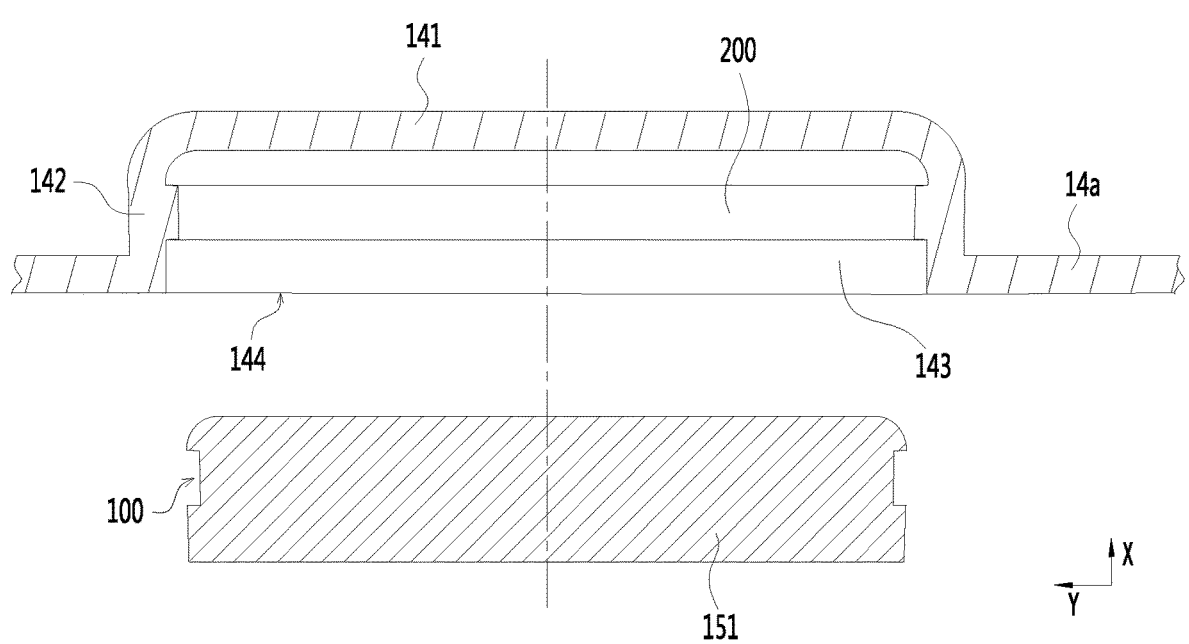
FIG. 7 is an exploded structural view of an insulating protection component and an extending portion of a current collector according to another embodiment of the disclosure.

In one embodiment, as shown in FIG. 6, the side plate 142 comprises a dent 100 in communication with the recess 143, and the column portion 151 comprises a bulge 200 for mating with the dent 100. In another embodiment, as shown in FIG. 7, the column portion 151 comprises a dent 100 communicating with the recess 143, and the side plate 142 comprises a bulge 200 for mating with the dent 100. Thus, the side plate 142 and the column portion 151 are connected through the bulge 200 and the dent 100 fitting with each other, and the connection stability between the side plate 142 and the column portion 151 can be effectively improved. In one example, each of the inner surface 142a of the side plate 142 forming the recess 143 and the outer surface 151a of the column portion 151 is a tapered surface, one of the side plate 142 and the column portion 151 is provided with a dent 100 that communicates with the recess 143, and the other is provided with a bulge 200 connected to the dent 100. As such, the side plate 142 provides double-constraint for the column portion 151. The connection stability between the side plate 142 and the insulating protection component 15 is further improved, and the column portion 151 is effectively prevented from coming out from the recess 143. In one example, each of the inner surface 142a of the side plate 142 forming the recess 143 and the outer surface 151a of the column portion 151 is a cylindrical surface. Along the radial direction Y of the electrode take-out hole 131a, the radial dimension of the recess 143 and the radial dimension of the column portion 151 do not change in a direction away from the top plate 141. Also, one of the side plate 142 and the column portion 151 is provided with a dent 100 communicating with the recess 143, and the other is provided with a bulge 200 connected to the dent 100.

In one embodiment, the column portion 151 is a solid structural body, such that the column portion 151 itself has a large structural rigidity. It can advantageously reduce the possibility that the column portion 151 comes out from the recess 143 due to structural deformation of the column portion 151. The surface of the column portion 151 away from the top plate 141 is flush with the edge of the opening of the recess 143, such that the occupied space of the insulating protection component 15 in the case 11 can be reduced and the energy density of the secondary battery 10 can be advantageously increased.

Figure 8:
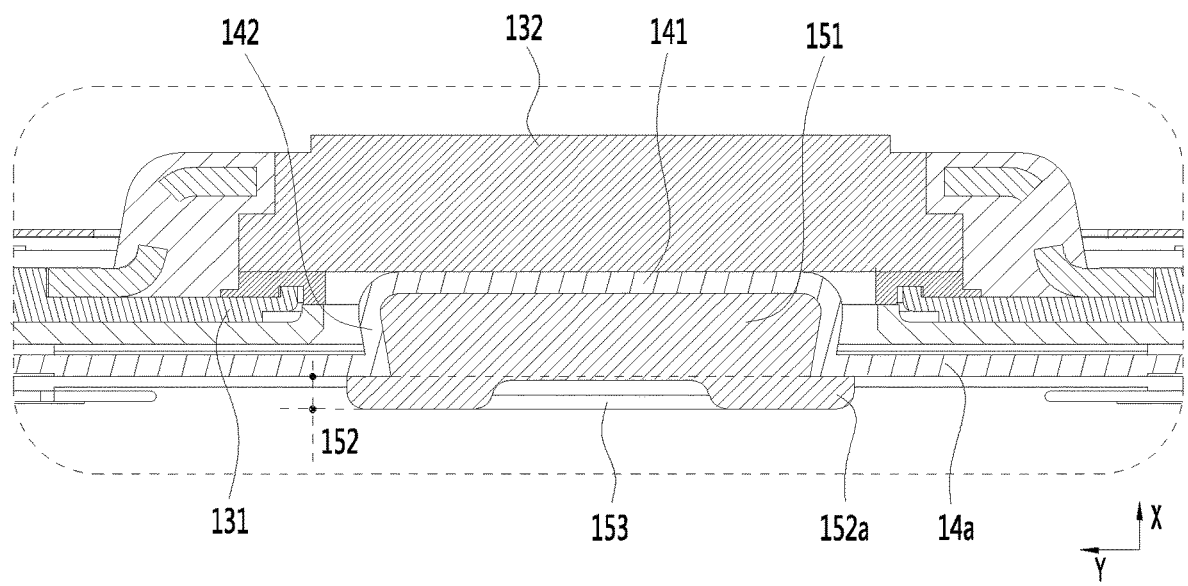
FIG. 8 is a sectional view of a partial structure of a secondary battery according to an embodiment of the disclosure.

In one embodiment, referring to FIG. 8, the insulating protection component 15 further comprises an exposed portion 152. The column portion 151 is connected to the exposed portion 152, and the exposed portion 152 is disposed at a side of the main body 14a away from the electrode terminal 132. The column portion 151 and the exposed portion 152 are arranged in the axial direction X of the electrode lead-out hole 131a. The exposed portion 152 is exposed outside the extending portion 14b. In one example, the exposed portion 152 comprises a protruding portion 152a that extends beyond an edge 144 of the opening. The protruding portion 152a covers the edge 144 of the opening. The protruding portion 152a is in contact with the surface of the main body 14a away from the electrode terminal 132. Optionally, the protruding portion 152a is an annular flange that extends circumferentially along the column portion 151. Thus, since the protruding portion 152a and the main body 14a are kept in contact, the protruding portion 152a can intercept the metal debris or other dust particles when they fall from the side plate 142 and the region of the column portion 151 near the opening of the recess 143. Thereby, the protection effect of the insulating protection component 15 is further improved. Optionally, the column portion 151 and the exposed portion 152 are integrally formed, such that the connection strength of the column portion 151 and the exposed portion 152 can be improved. The column portion 151 and the exposed portion 152 can also be manufactured at one time. For example, a plastic or hot melt adhesive in a molten state is pre-injected into the recess 143, and then the column portion 151 and the exposed portion 152 are formed by one-time extrusion molding using a molding apparatus. As such, the processing difficulty and processing cost can be reduced. In one example, the insulating protection component 15 comprises a depression 153. The depression 153 is recessed toward the column portion 151 from the surface of the exposed portion 152 away from the column portion 151. In this way, on one hand, it is advantageous to reduce the weight of the insulating protection component 15 and increase the energy density of the secondary battery 10. On the other hand, the depression 153 can be used to store gas generated inside the secondary battery 10 during operation, and the internal pressure of the secondary battery 10 can be reduced. Optionally, the column portion 151 is a solid structural body, and the depth of the depression 153 does not exceed the edge 144 of the opening of the recess 143.

In one embodiment, the insulating protection component 15 is a resilient structure. The insulating protection component 15 may be made of rubber, silica gel and the like.

In one embodiment, the insulating protection component 15 has a viscosity, and the insulating protection component 15 may be made from one or more of styrene, butadiene, and isoprene rubber. The insulating protection component 15 can adhere metal debris or other dust particles to the surface of the insulating protection component 15, and effectively prevent metal debris or other dust particles from falling.

The secondary battery 10 according to embodiments of the disclosure comprises a current collector 14 and an insulating protection component 15 connected to the current collector 14. The current collector 14 comprises a main body 14a and an extending portion 14b. The top plate 141 and the side plate 142 of the extending portion 14b are configured to form a recess 143. The insulating protection component 15 can block the recess 143, such that it can serve as a barrier for metal debris or other dust particles held in the recess 143, prevent the metal debris or other dust particles in the recess 143 from falling from the recess 143 to the electrode assembly 12, reduce the possibility that the metal debris or other dust particles pierce the separator of the electrode assembly 12 to cause an internal short circuit between the two electrode plates with opposite polarities, and effectively improves the safety in use of the secondary battery 10.

Although the disclosure has been described with reference to the preferred embodiments, various modifications may be made to the disclosure and components may be replaced with equivalents without departing from the scope of the disclosure. In particular, the technical features mentioned in the various embodiments can be combined in any manner as long as there is no structural conflict. The disclosure is not limited to the specific embodiments disclosed herein, but comprises all technical solutions falling within the scope of the claims.

What is claimed is:

1. A secondary battery comprising:
a cap assembly comprising a cap plate and an electrode terminal, wherein the cap plate comprises an electrode lead-out hole, and the electrode terminal is disposed on the cap plate and covers the electrode lead-out hole;
a current collector comprising a main body and an extending portion, wherein the main body is located at a side of the cap plate, the extending portion extends toward the electrode terminal in an axial direction of the electrode lead-out hole, the extending portion comprises a top plate and a side plate that are connected to the main body, the side plate is at least partially disposed in the electrode lead-out hole, the top plate is connected to the electrode terminal, and the side plate and the top plate are configured to form a recess; and
an insulating protection component comprising a column portion, wherein the column portion is disposed in the recess, and surfaces of the side plate and the top plate which form the recess are in contact with the column portion and covered by the column portion.

2. The secondary battery according to claim 1, wherein along a radial direction of the electrode lead-out hole, both a radial dimension of the recess and a radial dimension of the column portion are gradually reduced in a direction away from the top plate.

3. The secondary battery according to claim 2, wherein an inner surface of the side plate forming the recess is a tapered surface, and an outer surface of the column portion that matches the inner surface is a tapered surface.

4. The secondary battery according to claim 1, wherein one of the side plate and the column portion is provided with a dent that communicates with the recess, and the other is provided with a bulge connected to the dent.

5. The secondary battery according to claim 1, wherein the column portion is a solid structural body, and a surface of the column portion away from the top plate is flush with an opening edge of the recess.

6. The secondary battery according to claim 1, wherein the insulating protection component further comprises an exposed portion, wherein the column portion is connected to the exposed portion, and the exposed portion is disposed at a side of the main body away from the electrode terminal.

7. The secondary battery according to claim 6, wherein the column portion and the exposed portion are integrally formed.

8. The secondary battery according to claim 6, wherein the exposed portion comprises a protruding portion that extends beyond an opening edge of the recess, wherein the protruding portion covers the opening edge, and the protruding portion is in contact with a surface of the main body away from the electrode terminal.

9. The secondary battery according to claim 6, wherein the insulating protection component comprises a depression, which is recessed toward the column portion from a surface of the exposed portion away from the column portion.

10. The secondary battery according to claim 9, wherein the column portion is a solid structural body, and a depth of the depression does not exceed an opening edge of the recess.

11. The secondary battery according to claim 1, wherein the insulating protection component has a viscosity.

12. The secondary battery according to claim 5, wherein the insulating protection component further comprises an exposed portion, wherein the column portion is connected to the exposed portion, and the exposed portion is disposed at a side of the main body away from the electrode terminal.

13. The secondary battery according to claim 12, wherein the exposed portion comprises a protruding portion that extends beyond an opening edge of the recess, wherein the protruding portion covers the opening edge, and the protruding portion is in contact with a surface of the main body away from the electrode terminal.

14. The secondary battery according to claim 13, wherein the insulating protection component comprises a depression, which is recessed toward the column portion from a surface of the exposed portion away from the column portion.

15. The secondary battery according to claim 14, wherein the column portion is a solid structural body, and a depth of the depression does not exceed an opening edge of the recess.

16. The secondary battery according to claim 7, wherein the exposed portion comprises a protruding portion that extends beyond an opening edge of the recess, wherein the protruding portion covers the opening edge, and the protruding portion is in contact with a surface of the main body away from the electrode terminal.

17. The secondary battery according to claim 16, wherein the insulating protection component comprises a depression, which is recessed toward the column portion from a surface of the exposed portion away from the column portion.

18. The secondary battery according to claim 17, wherein the column portion is a solid structural body, and a depth of the depression does not exceed an opening edge of the recess.

19. The secondary battery according to claim 6, wherein the column portion and the exposed portion are integrally formed.

* * * * *